(12) United States Patent
Ouyang et al.

(10) Patent No.: US 12,255,688 B2
(45) Date of Patent: Mar. 18, 2025

(54) ONU MIGRATION DETECTION METHOD, OLT, ONU AND STORAGE MEDIUM

(71) Applicant: ZTE Corporation, Shenzhen (CN)

(72) Inventors: Haiming Ouyang, Shenzhen (CN); Lina Fu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 113 days.

(21) Appl. No.: 18/015,939

(22) PCT Filed: Jul. 8, 2021

(86) PCT No.: PCT/CN2021/105274
§ 371 (c)(1),
(2) Date: Jan. 12, 2023

(87) PCT Pub. No.: WO2022/022255
PCT Pub. Date: Feb. 3, 2022

(65) Prior Publication Data
US 2023/0275665 A1    Aug. 31, 2023

(30) Foreign Application Priority Data
Jul. 30, 2020 (CN) .......................... 202010753795.9

(51) Int. Cl.
*H04Q 11/00* (2006.01)
*H04B 10/27* (2013.01)

(52) U.S. Cl.
CPC ......... *H04B 10/27* (2013.01); *H04Q 11/0067* (2013.01); *H04Q 2011/0081* (2013.01)

(58) Field of Classification Search
CPC ................................................ H04Q 11/0067
See application file for complete search history.

(56) References Cited

U.S. PATENT DOCUMENTS

| | | | |
|---|---|---|---|
| 2009/0162065 A1* | 6/2009 | Mizutani | H04Q 11/0067 398/66 |
| 2012/0072973 A1* | 3/2012 | Gao | H04L 9/3273 726/5 |

(Continued)

FOREIGN PATENT DOCUMENTS

| | | |
|---|---|---|
| CN | 102149027 A | 8/2011 |
| CN | 102368836 A | 3/2012 |

(Continued)

OTHER PUBLICATIONS

R. Gu, S. Zhang, Z. Yan and Y. Ji, "Efficient ONU Migration for Fixed and Mobile Convergence Network in High-Speed Rail Area," 2017 International Conference on Networking and Network Applications (NaNA), Kathmandu, Nepal, 2017, pp. 36-41, doi: 10.1109/NaNA.2017.35 (Year: 2017).*

(Continued)

*Primary Examiner* — Nathan M Cors
(74) *Attorney, Agent, or Firm* — Wolf, Greenfield & Sacks, P.C.

(57) ABSTRACT

Disclosed are an ONU migration detection method, OLT, ONU and storage medium. The ONU migration detection method may include: receiving first identification information from an ONU, the first identification information is configured to uniquely identify a historical position accessed by the ONU; acquiring second identification information according to a current position of the ONU, the second identification information is configured to uniquely identify the current position; and comparing the first identification information with the second identification information, and determining that ONU migration occurs in response to the first identification information being mismatched with the second identification information.

15 Claims, 5 Drawing Sheets

(56) References Cited

U.S. PATENT DOCUMENTS

| 2013/0195439 | A1* | 8/2013 | Mangin | H04Q 11/0067 |
| | | | | 398/2 |
| 2016/0149756 | A1 | 5/2016 | Cui et al. | |
| 2016/0285555 | A1* | 9/2016 | Wu | H04J 3/0682 |
| 2017/0055053 | A1* | 2/2017 | Zhang | H04J 14/0238 |

FOREIGN PATENT DOCUMENTS

| CN | 102739624 A | 10/2012 |
| CN | 105450326 A | 3/2016 |

OTHER PUBLICATIONS

Extended European Search Report for European Application No. 21850685.5, dated Nov. 13, 2023.

[No Author Listed] G.988 Amendment 3, Series G: Transmission systems and media, digital systems and networks: digital sections and digital line system—Optical line systems for local and access networks. ONU management and control interface (OMCI) specification. Telecommunication Standardization Sector of the International Telecommunication Union. Mar. 2020:1-692.

Gu et al., Efficient ONU Migration for Fixed and Mobile Convergence Network in High-Speed Rail Area. 2017 International Conference on Networking and Network Applications (NaNA). Oct. 16, 2017:36-41.

International Search Report and Written Opinion for International Application No. PCT/CN2021/105274 mailed Oct. 11, 2021.

Lu, Discussion on Agile Migration of PON Service Port. C-Enterprise Management. China Academic Journal Electronic Publishing House. Apr. 2020;78-80.

\* cited by examiner

ONU MIGRATION DETECTION METHOD, OLT, ONU AND STORAGE MEDIUM

CROSS-REFERENCE TO RELATED APPLICATION

This application is a national stage filing under 35 U.S.C. § 371 of international application number PCT/CN2021/105274, filed Jul. 8, 2021, which claims priority to Chinese patent application No. 202010753795.9, filed Jul. 30, 2020. The contents of these applications are incorporated herein by reference in their entirety.

TECHNICAL FIELD

The present disclosure relates to the technical field of communication, and more particularly, to an ONU migration detection method, OLT, ONU and storage medium.

BACKGROUND

In current Gigabit-capable Passive Optical Networks (GPON), Time and Wavelength Division Multiplexed Passive Optical Networks (TWDM-PON) and other access systems, in practical engineering applications, there are common scenarios where equipment upgrade, replacement, maintenance, etc., involve change at one end of an Optical Line Termination (OLT) or an Optical Network Unit (ONU), that is, ONU migration.

At present, due to the lack of detection methods for ONU migration, manual judgment is usually needed in practical engineering applications, so the accuracy and efficiency are low.

SUMMARY

The following is an overview of the subject described in detail herein. The overview is not intended to limit the scope of protection of the claims.

Embodiments of the present disclosure provide an Optical Network Unit (ONU) migration detection method, an Optical Line Termination (OLT), an ONU and a storage medium.

In accordance with an aspect of the present disclosure, an embodiment provides an ONU migration detection method. The method may include: receiving first identification information from an ONU, where the first identification information is configured to uniquely identify a historical position accessed by the ONU; acquiring second identification information according to a current position of the ONU, where the second identification information is configured to uniquely identify the current position; and comparing the first identification information with the second identification information, and determining that ONU migration occurs in response to the first identification information being mismatched with the second identification information.

In accordance with an aspect of the present disclosure, an embodiment further provides an ONU migration detection method. The method may include: sending first identification information to an OLT, so that the OLT compares the first identification information with second identification information and performs migration detection on an ONU according to a comparison result, where it is determined that ONU migration occurs in response to the first identification information being mismatched with the second identification information, the first identification information is configured to uniquely identify a historical position accessed by the ONU, and the second identification information is configured to uniquely identify a current position accessed by the ONU.

In accordance with another aspect of the present disclosure, an embodiment further provides an OLT. The OLT may include at least one processor and a memory configured to be communicatively connected with the at least one processor, where the memory stores an instruction executable by the at least one processor which, when executed by the at least one processor, causes the at least one processor to perform the ONU migration detection method described above.

In accordance with another aspect of the present disclosure, an embodiment further provides an ONU. The ONU may include at least one processor and a memory configured to be communicatively connected with the at least one processor, where the memory stores an instruction executable by the at least one processor which, when executed by the at least one processor, causes the at least one processor to perform the ONU migration detection method described above.

In accordance with another aspect of the present disclosure, an embodiment further provides a computer-readable storage medium storing a computer executable instruction which, when executed by a computer, causes the computer to perform the ONU migration detection method described above.

Other features and advantages of the present disclosure will be set forth in the following description, and partly become obvious from the description, or understood by implementing the present disclosure. The objects and other advantages of the present disclosure can be realized and obtained by the structure particularly pointed out in the description, claims and drawings.

BRIEF DESCRIPTION OF DRAWINGS

The drawings are provided for a further understanding of the technical schemes of the present disclosure and constitute a part of the description. The drawings and the embodiments of the present disclosure are intended to illustrate the technical schemes of the present disclosure and do not constitute a limitation to the technical schemes of the present disclosure.

DETAILED DESCRIPTION

In order to make the objects, technical schemes and advantages of the present disclosure clear, the present disclosure will be further described in detail with reference to the drawings and embodiments. It should be understood that the embodiments described here are only used to illustrate the present disclosure, and are not intended to limit the present disclosure.

It should be understood that in the description of the embodiments of the present disclosure, "a plurality of" (or multiple) means two or more than two. "Greater than", "less than", "exceeding", etc., are understood as excluding this number, while "above", "below", "within", etc., are understood as including this number. "First", "second" and the like are only used for the purpose of distinguishing technical features, and are not intended to be understood to indicate or imply relative importance or imply the number of indicated technical features or imply a precedence order of indicated technical features.

Figure 1:
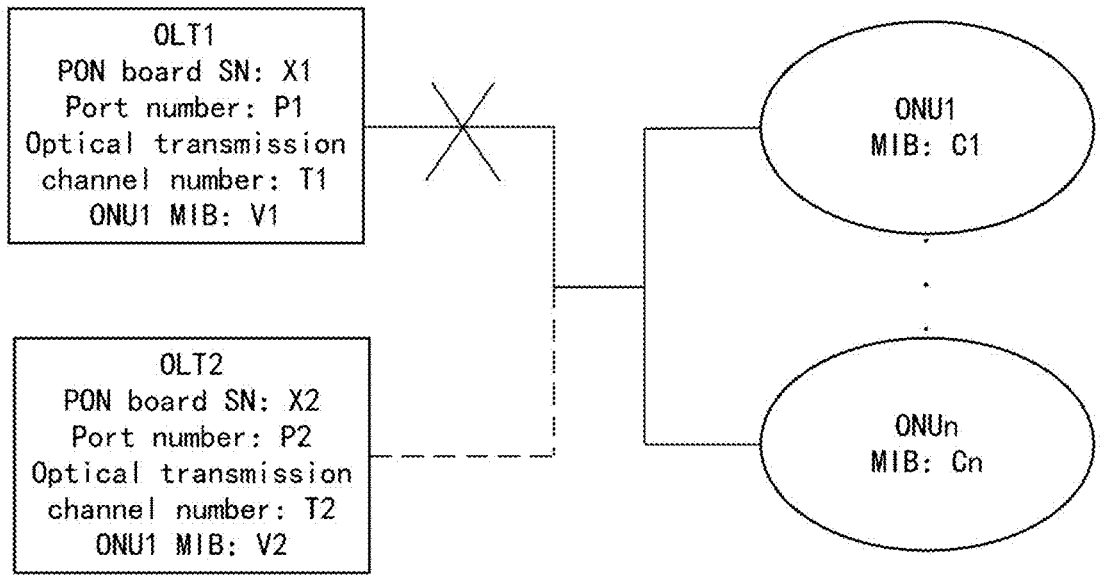
FIG. 1 is a schematic diagram of an Optical Network Unit (ONU) migration scenario in a Gigabit-capable Passive Optical Network (GPON) provided by an embodiment of the present disclosure.

Referring to FIG. 1, FIG. 1 is a schematic diagram of an Optical Network Unit (ONU) migration scenario in a Gigabit-capable Passive Optical Networks (GPON). Several ONUs (ONU1 to ONUn) are connected under an Optical Line Termination 1 (OLT1). Taking the ONU1 as an example, the ONU1 is required to be migrated from the OLT1 to an OLT2 due to migration requirements of equipment update, etc. In engineering applications, due to equipment debugging, the ONU1 may be switched between the OLT1 and the OLT2, and the ONU 1 may have operated normally on both the OLT1 and the OLT2. On this basis, a count value of an MIB counter of the ONU1 under the OLT1 is V1, and a count value of an MIB counter of the ONU1 at the OLT1 is C1. Generally, V1=C1.

The ONU1 is now migrated from the OLT1 to the OLT2, where a count value of the MIB counter of the ONU1 under the OLT2 is V2. If V1=V2, when the ONU1 goes online again on the OLT2, because the count value of the MIB counter stored locally by the OLT2 is the same as the count value of the MIB counter acquired by the OLT2 from the ONU1 (i.e., V2=C1), the OLT2 considers that the service configuration data of the ONU1 under the OLT1 is consistent with the service configuration data of the ONU1 under the OLT2, and the ONU1 directly enters an operating state.

However, even if the count value of the MIB counter stored locally by the OLT2 is the same as the count value of the MIB counter acquired by the OLT2 from the ONU1, the service configuration data of the ONU1 under the OLT1 may be inconsistent with the service configuration data of the ONU1 under the OLT2. For example, the service configuration data under the OLT1 is data service, and the service configuration data under the OLT2 is voice service. Therefore, when directly entering an operating state under the OLT2, the ONU1 may operate abnormally.

In addition, even if the count value of the MIB counter stored locally by the OLT2 is the same as the count value of the MIB counter acquired by the OLT2 from the ONU1, comparing the service configuration data of the ONU1 under the OLT1 with the service configuration data of the ONU1 under the OLT2 may involve a large amount of data, leading to a low efficiency.

Therefore, if it can be judged that ONU1 migration occurs, it can be quickly known that the ONU1 may operate abnormally. However, at present, due to the lack of detection methods for ONU migration, manual judgment is usually needed in practical engineering applications, so the accuracy and efficiency are low.

In view of the above, an embodiment of the present disclosure provides an ONU migration detection method, an OLT, an ONU and a storage medium, which can improve the accuracy and efficiency of ONU migration detection.

Figure 2:
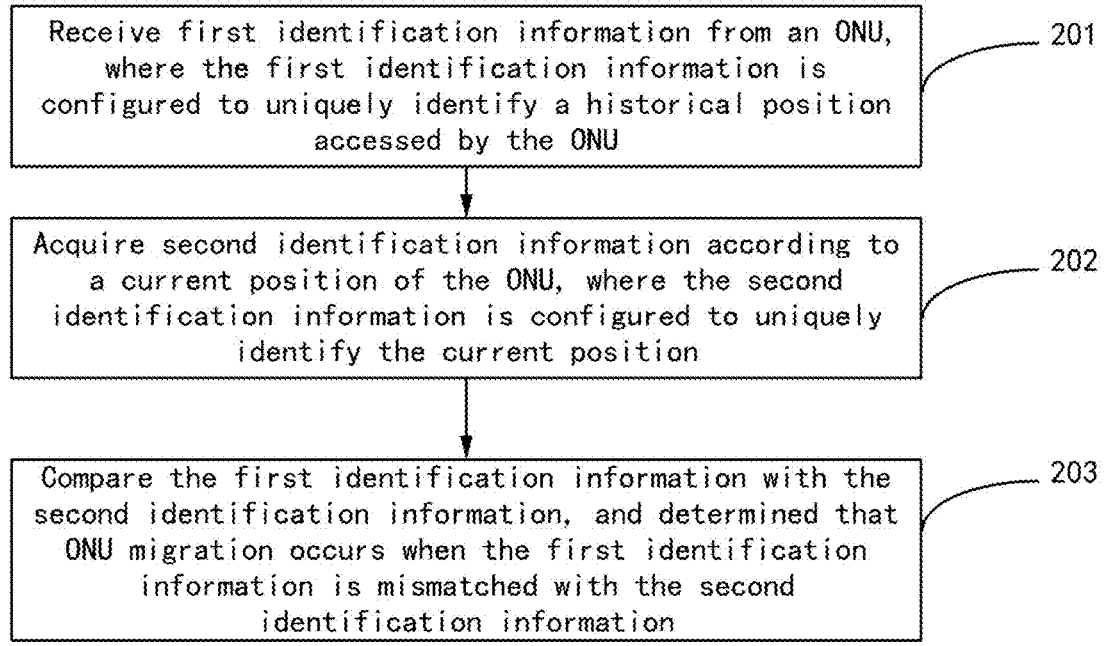
FIG. 2 is a flowchart of an ONU migration detection method applied to an Optical Line Termination (OLT) side provided by an embodiment of the present disclosure.

Referring to FIG. 2, an embodiment of the present disclosure provides an ONU migration detection method which is applied to an OLT. The method includes, but is not limited to, the following steps S201 to S203.

At S201, first identification information from an ONU is received, where the first identification information is configured to uniquely identify a historical position accessed by the ONU.

At S202, second identification information is acquired according to a current position of the ONU, where the second identification information is configured to uniquely identify the current position.

At S203, the first identification information is compared with the second identification information, and it is determined that ONU migration occurs when the first identification information is mismatched with the second identification information.

The first identification information is configured to uniquely identify a historical position accessed by the ONU, and the second identification information is configured to uniquely identify a current position accessed by the ONU. That is, if the historical position and the current position accessed by the ONU are different, the first identification information and the second identification information are different.

Receiving the first identification information and acquiring the second identification information are performed when the ONU goes online. The historical position is a position accessed by the ONU recently, and the current position is a position currently accessed by the ONU. If the ONU is not migrated, the historical position of the ONU is consistent with the current position; and if ONU is migrated, the historical position of the ONU is inconsistent with the current position. For example, the ONU is connected to the first OLT, and connection to the first OLT is kept unchanged. At this time, the historical position of the ONU is the first OLT, and the current position of the ONU is also the first OLT. Based on this, the ONU is migrated from the first OLT to a second OLT. At this time, the historical position of the ONU is the first OLT, and the current position is the second OLT. After the ONU goes online on the OLT, the historical position of the ONU is updated to the second OLT.

Therefore, if ONU migration occurs, the first identification information is mismatched with the second identification information. Thus, whether ONU migration occurs or not can be judged by whether the first identification information is matched with the second identification information or not, which is beneficial to improving the accuracy and efficiency of ONU migration detection.

It can be understood that if the first identification information is matched with the second identification information, it is proved that ONU migration does not occur.

In an embodiment, after it is determined that ONU migration occurs, the second identification information is sent to the ONU, so that the ONU updates the previously stored first identification information to the second identification information for a next migration detection.

In an embodiment, in case of ONU migration, the ONU may be migrated from the first OLT to the second OLT. Based on this, the historical position is the first OLT, and the current position is the second OLT. The first identification information includes a first OLT identifier (ID) corresponding to the first OLT, and the second identification information includes a second OLT ID corresponding to the second OLT. Since the first OLT ID is different from the second OLT ID, it can be determined that ONU migration occurs according to the first OLT ID and the second OLT ID.

Certainly, it can be understood that if ONU migration does not occur, the first OLT and the second OLT are the same OLT.

Based on this, in an embodiment, the first OLT ID includes a first PON board ID, and the second OLT ID includes a second PON board ID. In an embodiment, the first PON board ID and the second PON board ID may be corresponding PON board Serial Numbers (SN), and OLT IDs corresponding to different OLTs are different.

In an embodiment, the first OLT ID may further include a first manufacturer ID and a first PON board ID, and the second OLT ID may further include a second manufacturer ID and a second PON board ID, where the first manufacturer ID and the second manufacturer ID are used to identify different manufacturers. In an embodiment, the first manufacturer ID and the second manufacturer ID may be vendor fields in a management entity OLT-G (ME 131). By combining the manufacturer ID with the PON board ID, the uniqueness of the OLT ID can be guaranteed, thereby ensuring the accuracy of migration detection.

In an embodiment, in case of ONU migration, the ONU may be migrated from a first port to a second port. Based on this, the historical position is the first port, and the current position is the second port. The first identification information includes a first port ID corresponding to the first port, and the second identification information includes a second port ID corresponding to the second port. When the first port and the second port are located in the same OLT, because the first port ID is different from the second port ID, it can be determined that ONU migration occurs according to the first port ID and the second port ID.

In an embodiment, the first port may be located at the first OLT, and the second port may be located at the second OLT. Thus, the identification information includes both the OLT ID and the port ID to guarantee the uniqueness of the identification information. For example, when both the first port and the second port are located at the first OLT, the first port ID and the second port ID are different. When the first port is located at the first OLT and the second port is located at the second OLT, the first port ID of the first port may be P1, and the second port ID of the second port may also be P1, that is, ports in different OLTs may have the same port ID. Therefore, by adding the OLT ID to the identification information, when both the first port and the second port are located at the first OLT, the first identification information includes a first OLT ID and a first port ID which correspond to the first port, and the second identification information includes a first OLT ID and a second port ID which correspond to the second port. When the first port is located at the first OLT and the second port is located at the second OLT, the first identification information includes a first OLT ID and a first port ID which correspond to the first port, and the second identification information includes a second OLT ID and a second port ID which correspond to the second port.

Because the first OLT ID and the second OLT ID are different, the uniqueness of the first identification information and the second identification information is guaranteed, thereby increasing the reliability of ONU migration detection.

In an embodiment, in case of ONU migration, the ONU may be migrated from a first optical transmission channel to a second optical transmission channel. Based on this, the historical position is the first optical transmission channel, and the current position is the second optical transmission channel. The first identification information includes a first channel ID corresponding to the first optical transmission channel, and the second identification information includes a second channel ID corresponding to the second optical transmission channel. When the first optical transmission channel and the second optical transmission channel are located in the same port, since the first channel ID is different from the second channel ID, it can be determined that ONU migration occurs according to the first channel ID and the second channel ID.

In an embodiment, the first optical transmission channel may be located at the first port and the second optical transmission channel may be located at the second port. Moreover, the first port and the second port may be located in the same OLT or different OLTs. Thus, the identification information includes an OLT ID, a port ID and a channel ID to ensure the uniqueness of the identification information. For example, when both the first optical transmission channel and the second optical transmission channel are located at the first port, the first channel ID and the second channel ID are different. When the first optical transmission channel is located at the first port, and the second optical transmission channel is located at the second port, the first channel ID of the first optical transmission channel may be T1, and the second channel ID of the second optical transmission channel may also be T1, that is, the optical transmission channels in different ports may have the same channel ID. Similarly, the first port and the second port may be located in the same OLT or different OLTs. Therefore, by adding the OLT ID and the port ID to the identification information, when both the first optical transmission channel and the second optical transmission channel are located at the first port, the first identification information includes a first OLT ID, a first port ID and a first channel ID which correspond to the first optical transmission channel, and the second identification information includes a first OLT ID, a first port ID and a second channel ID which correspond to the second optical transmission channel. When the first optical transmission channel is located at the first port, the second optical transmission channel is located at the second port, and both the first port and the second port are located at the first OLT, the first identification information includes a first OLT ID, a first port ID and a first channel ID which correspond to the first optical transmission channel, and the second identification information includes a first OLT ID, a second port ID and a second channel ID which correspond to the second optical transmission channel. Because the first port ID and the second port ID are different, the uniqueness of the first identification information and the second identification information is guaranteed, and the reliability of ONU migration detection is improved. When the first optical transmission channel is located at the first port, the second optical transmission channel is located at the second port, the first port is located at the first OLT, and the second port is located at the second OLT, the first identification information includes a first OLT ID, a first port ID and a first channel ID which correspond to the first optical transmission channel, and the second identification information includes a second OLT ID, a second port ID and a second channel ID which correspond to the second optical transmission channel. Because the first OLT ID and the second OLT ID are different, the uniqueness of the first identification information and the second identification information is guaranteed, and the reliability of ONU migration detection is improved.

Figure 3:
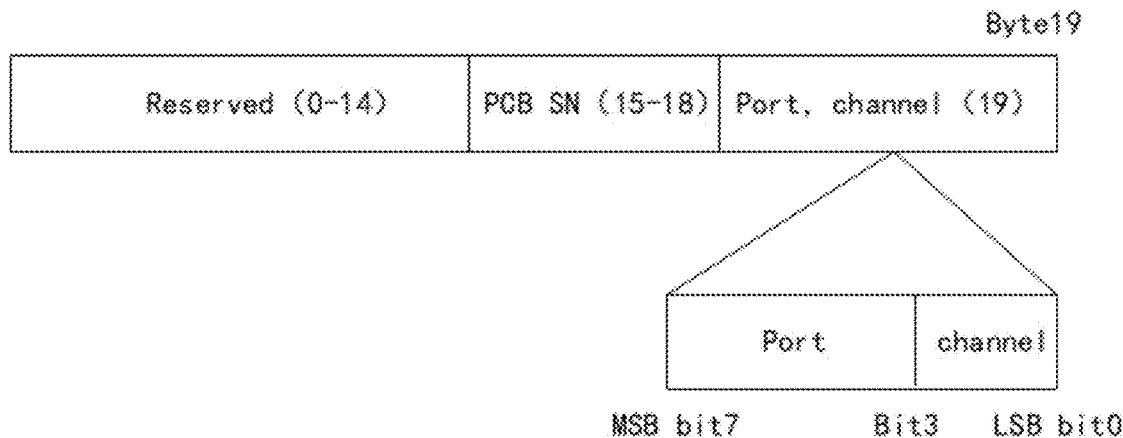
FIG. 3 is a schematic structural diagram of an equipment ID field provided by an embodiment of the present disclosure.

In an embodiment, the port ID may be a port number and the channel ID may be a channel number. Referring to FIG. 3, the PON board SN, the port number and the channel number may be obtained from an equipment ID field in the management entity OLT-G (ME 131).

In an embodiment, when it is determined that ONU migration occurs, an update instruction is sent to the ONU to enable the ONU to update service configuration data. Taking the migration of the ONU from the first OLT to the second OLT as an example, service configuration data under the first OLT is data service configuration data, and service configuration data under the second OLT is voice service configuration data. When the ONU is migrated from the first OLT to the second OLT, an update instruction is sent to the ONU to enable the ONU to update service configuration data, or enable the ONU to update the original data service configuration data to the voice service configuration data to guarantee that the ONU can operate normally on the second OLT.

In an embodiment, when it is determined that ONU migration occurs, a restart instruction may be sent to the ONU to restart the ONU, and the restart of the ONU can trigger the update of the service configuration data. The update of the service configuration data is consistent with the above-described example, which will not be repeated here.

The ONU can operate normally by enabling the ONU to update the service configuration data. Moreover, based on the above ONU migration detection method, the update of the service configuration data is triggered by a determination as to whether ONU migration occurs or not, which is beneficial to improving the accuracy of the update of the service configuration data and the operation reliability of the ONU.

Figure 4:
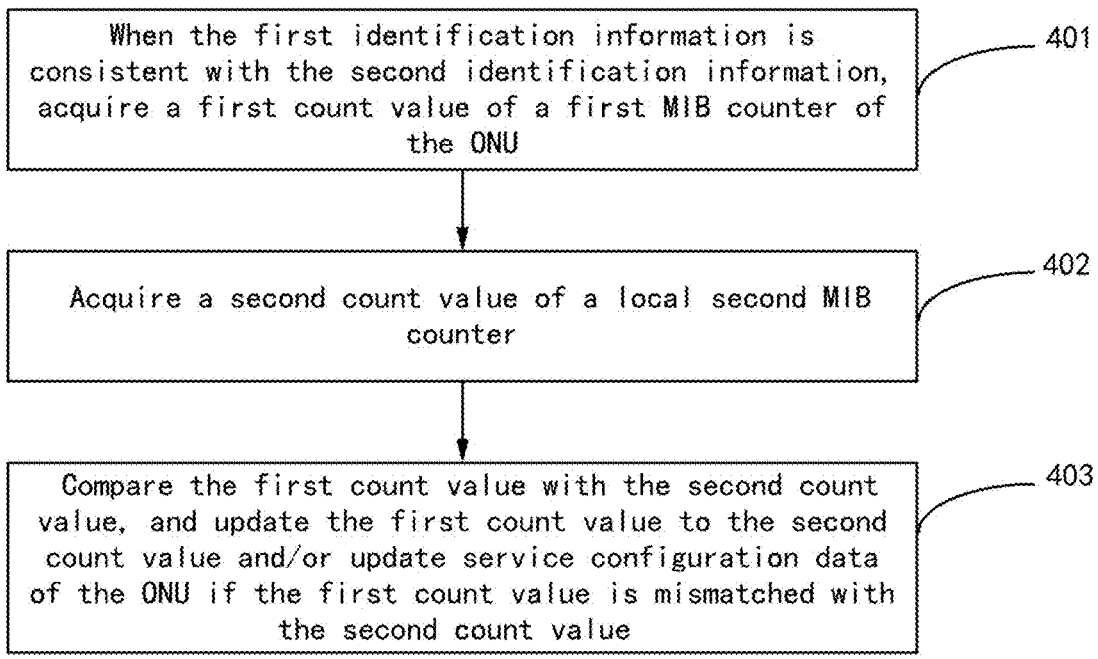
FIG. 4 is a flowchart showing additional steps of an ONU migration detection method provided by an embodiment of the present disclosure.

In an embodiment, referring to FIG. 4, the ONU migration detection method described above may further include the following steps S401 to S403:

At S401, when the first identification information is consistent with the second identification information, a first count value of a first MIB counter of the ONU is acquired.

At S402, a second count value of a local second MIB counter is acquired.

At S403, the first count value is compared with the second count value, and the first count value is updated to the second count value and/or the service configuration data of the ONU is updated if the first count value is mismatched with the second count value.

When it is determined that ONU migration does not occur, but the first count value of the first MIB counter of the ONU is inconsistent with the second count value of the second local MIB counter of the OLT, the first count value is updated to the second count value to make the count values of MIB counters of ONU and OLT consistent, and the service configuration data of the ONU is updated, so as to ensure the stability of the ONU.

It can be understood that either or both of updating the first count value to the second count value and updating the service configuration data of the ONU may be performed, which is not be limited in the embodiment of the present disclosure.

Figure 5:
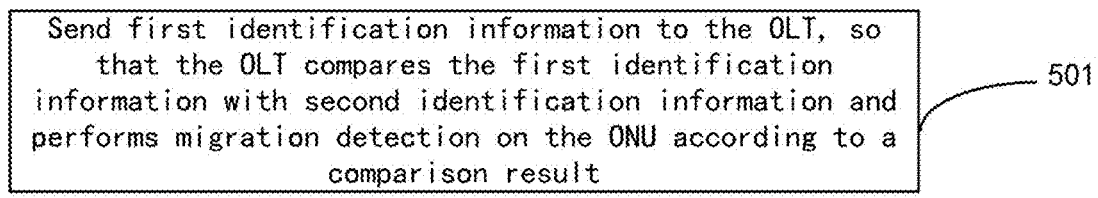
FIG. 5 is a flowchart of an ONU migration detection method applied to an ONU side provided by an embodiment of the present disclosure.

In addition, referring to FIG. 5, an embodiment of the present disclosure further provides an ONU migration detection method which is applied to an ONU. The method includes, but not limited to, a following step S501.

At S501, first identification information is sent to an OLT, so that the OLT compares the first identification information with second identification information and performs migration detection on the ONU according to a comparison result; where when the first identification information is mismatched with the second identification information, it is determined that ONU migration occurs, the first identification information is configured to uniquely identify a historical position accessed by the ONU, and the second identification information is configured to uniquely identify a current position accessed by the ONU.

Similar to the above ONU migration detection method applied to an OLT, since the first identification information uniquely identifies the historical position of the ONU and the second identification information uniquely identifies the current position of the ONU, when ONU migration occurs, the first identification information and the second identification information are mismatched, so that whether ONU migration occurs or not can be judged by whether the first identification information is matched with the second identification information or not. Therefore, compared with the ONU migration detection method adopting the count value of the MIB counter, the reliability of ONU migration detection can be improved by utilizing the first identification information and the second identification information to perform migration detection on the ONU.

In an embodiment, after it is determined that ONU migration occurs, the ONU receives the second identification information sent by the OLT, and updates the first identification information to the second identification information for a next migration detection.

Figure 6:
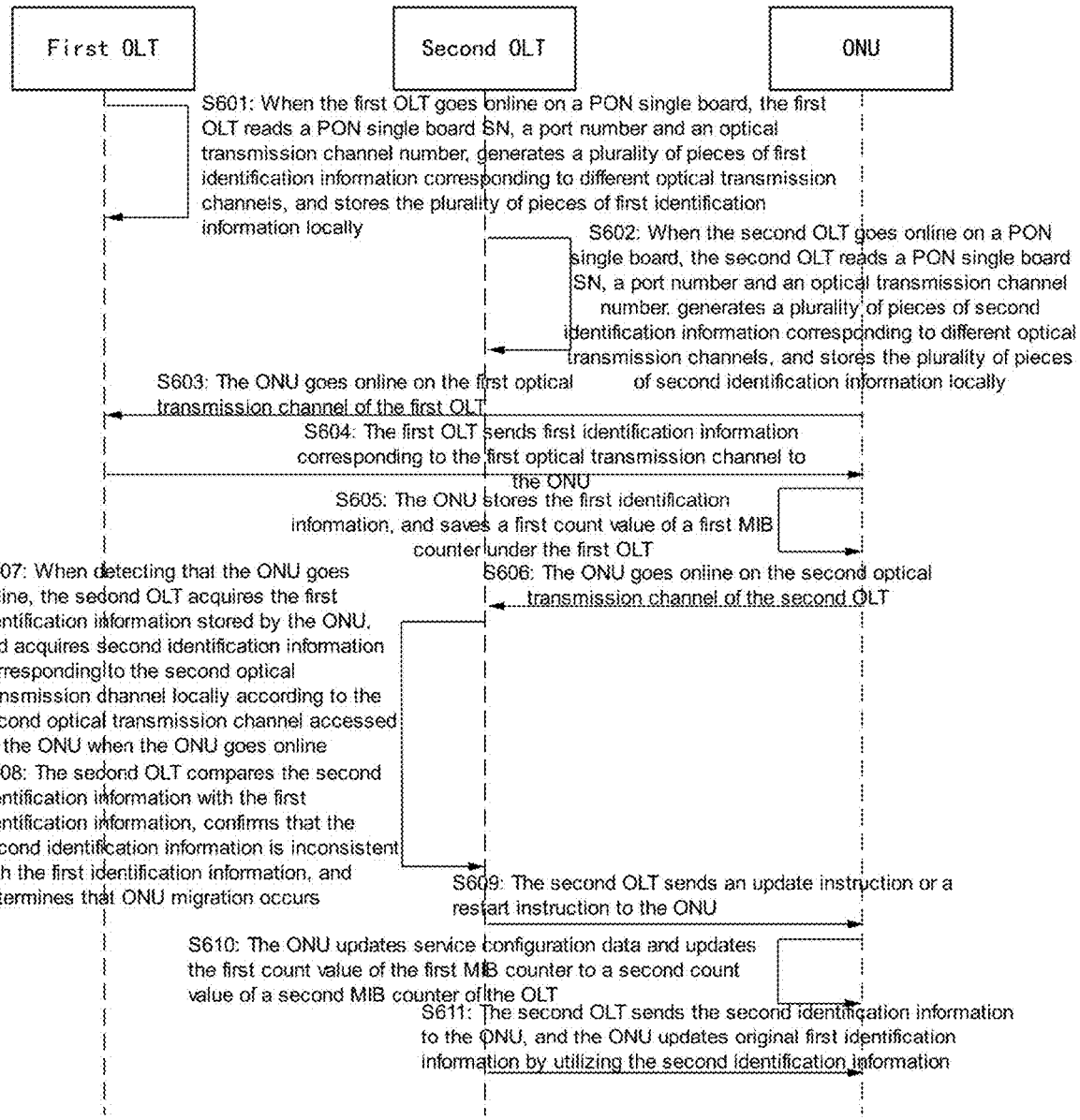
FIG. 6 is a flowchart of an ONU migration detection method provided by an embodiment of the present disclosure in a scenario where an ONU is migrated from a first optical transmission channel of a first OLT to a second optical transmission channel of a second OLT.

The principle of the ONU migration detection method in the embodiment of the present disclosure is illustrated with an example below, and is firstly illustrated with a scenario where an ONU is migrated from a first optical transmission channel of a first OLT to a second optical transmission channel of a second OLT. Referring to FIG. 6, the method includes the following steps S601 to S611.

At S601, when the first OLT goes online on a PON single board, the first OLT reads a PON single board SN, a port number and an optical transmission channel number, generates a plurality of pieces of first identification information corresponding to different optical transmission channels, and stores the plurality of pieces of first identification information locally.

At S602, when the second OLT goes online on a PON single board, the second OLT reads a PON single board SN, a port number and an optical transmission channel number, generates a plurality of pieces of second identification information corresponding to different optical transmission channels, and stores the plurality of pieces of second identification information locally.

At S603, the ONU goes online on the first optical transmission channel of the first OLT.

At S604, the first OLT sends first identification information corresponding to the first optical transmission channel to the ONU.

At S605, the ONU stores the first identification information, and saves a first count value of a first MIB counter under the first OLT.

At S606, the ONU goes online on the second optical transmission channel of the second OLT.

At S607, when the second OLT detects that the ONU goes online, the second OLT acquires the first identification information stored by the ONU, and acquires second identification information corresponding to the second optical transmission channel locally according to the second optical transmission channel accessed by the ONU when the ONU goes online.

At S608, the second OLT compares the second identification information with the first identification information, confirms that the second identification information is inconsistent with the first identification information, and determines that ONU migration occurs.

At S609, the second OLT sends an update instruction or a restart instruction to the ONU.

At S610, the ONU updates service configuration data and updates the first count value of the first MIB counter to a second count value of a second MIB counter of the second OLT.

At S611, the second OLT sends the second identification information to the ONU, and the ONU updates original first identification information by utilizing the second identification information.

Figure 7:
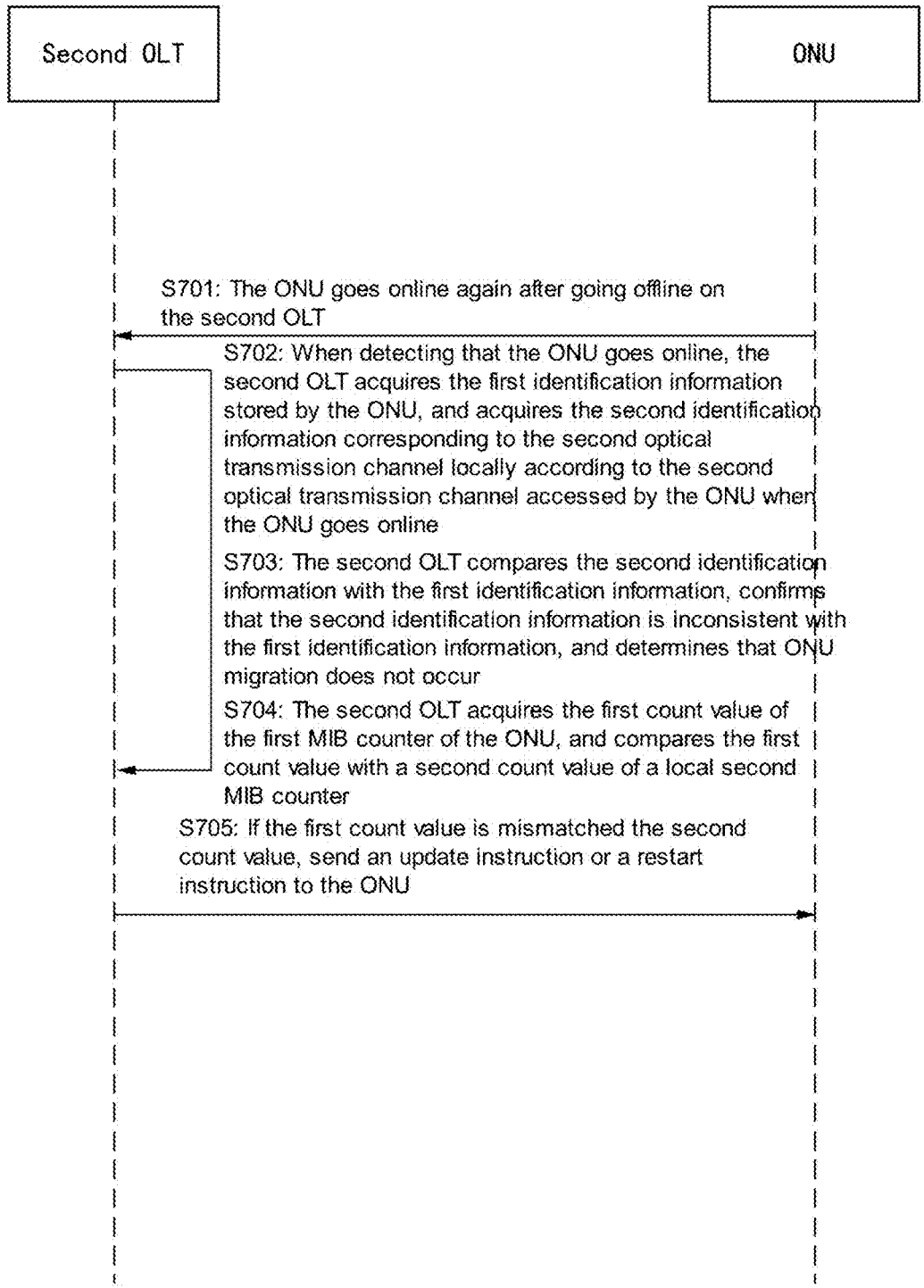
FIG. 7 is a flowchart of an ONU migration detection method provided by an embodiment of the present disclosure in a scenario where an ONU goes online after going offline on the second optical transmission channel of the second OLT.

Then, referring to FIG. 7, based on the above steps S601 to S611, the principle of the ONU migration detection method in the embodiment of the present disclosure is illustrated below with a scenario where the ONU goes online after going offline on the second optical transmission channel of the second OLT. The method includes the following steps S701 to S705.

At S701, the ONU goes online again after going offline on the second OLT.

At S702, when the second OLT detects that the ONU goes online, the second OLT acquires the first identification information stored by the ONU, and acquires the second identification information corresponding to the second optical transmission channel locally according to the second optical transmission channel accessed by the ONU when the ONU goes online.

At S703, the second OLT compares the second identification information with the first identification information, confirms that the second identification information is inconsistent with the first identification information, and determines that ONU migration does not occur.

At 704, the second OLT acquires the first count value of the first MIB counter of the ONU, and compares the first count value with a second count value of a local second MIB counter.

At S705, if the first count value is mismatched the second count value, an update instruction or a restart instruction is sent to the ONU.

At S611, since the ONU receives the second identification information of the second OLT and updates the local first identification information, at S703, the comparison result of the second OLT shows that the second identification information is consistent with the first identification information. Furthermore, since the ONU may have the problem of data asynchronization after going online again, the second OLT compares the second count value of the local second MIB counter with the first count value of the ONU. If the first count value is mismatched with the second count value, the second OLT sends an update instruction or a restart instruction to the ONU to enable the ONU to perform data synchronization, so as to ensure the stability of the ONU. If the first count value is matched with the second count value, it is proved that the data of the ONU is synchronized with the data of the second OLT, and the ONU can operate normally.

It should also be understood that various implementations provided by the embodiments of the present disclosure can be arbitrarily combined to achieve different technical effects.

Figure 8:
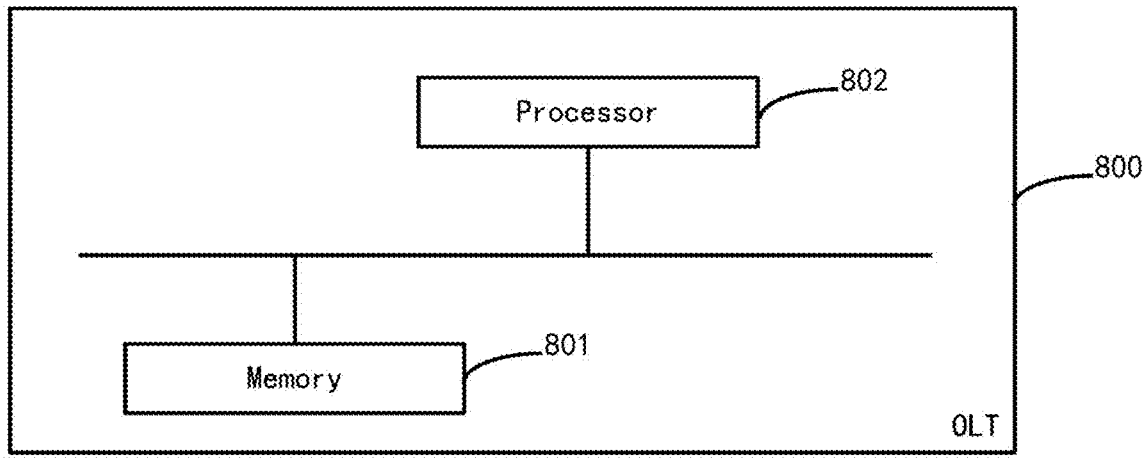
FIG. 8 is a schematic structural diagram of an OLT provided by an embodiment of the present disclosure.

FIG. 8 shows an OLT 800 provided by an embodiment of the present disclosure. The OLT 800 includes a memory 801, a processor 802, and a computer program stored in the memory 801 and executable by the processor 802 which, when executed by the processor 802, causes the processor 802 to perform the ONU migration detection method described above.

The processor 802 and the memory 801 may be connected by a bus or other means.

As a non-transient computer-readable storage medium, the memory 801 may be configured to store non-transient software programs and non-transient computer executable programs, such as the ONU migration detection method described in the embodiment of the present disclosure. The processor 802 executes non-transient software programs and instructions stored in the memory 801 to perform the ONU migration detection method described above.

The memory 801 may include a program storage area and a data storage area. The program storage area may store an operating system, and an application program required by at least one function. The data storage area may store data configured to execute the ONU migration detection method described above. In addition, the memory 801 may include a high-speed random-access memory 801, and may also include a non-transient memory 801, such as at least one magnetic disk storage device, a flash memory device, or other non-transient solid state storage device. In some implementations, the memory 801 may include memories 801 remotely located with respect to the processor 802, and these remote memories 801 may be connected to the OLT 800 through networks. Examples of the above networks include, but are not limited to, the Internet, an intranet, a local area network, a mobile communication network and combinations thereof.

The non-transient software programs and instructions required to perform the above ONU migration detection method are stored in the memory 801 which, when executed by one or more processors 802, cause the one or more processors 802 to perform the above ONU migration detection method, for example, the method steps S201 to S203 in FIG. 2 and the method steps S401 to S403 in FIG. 4.

Figure 9:
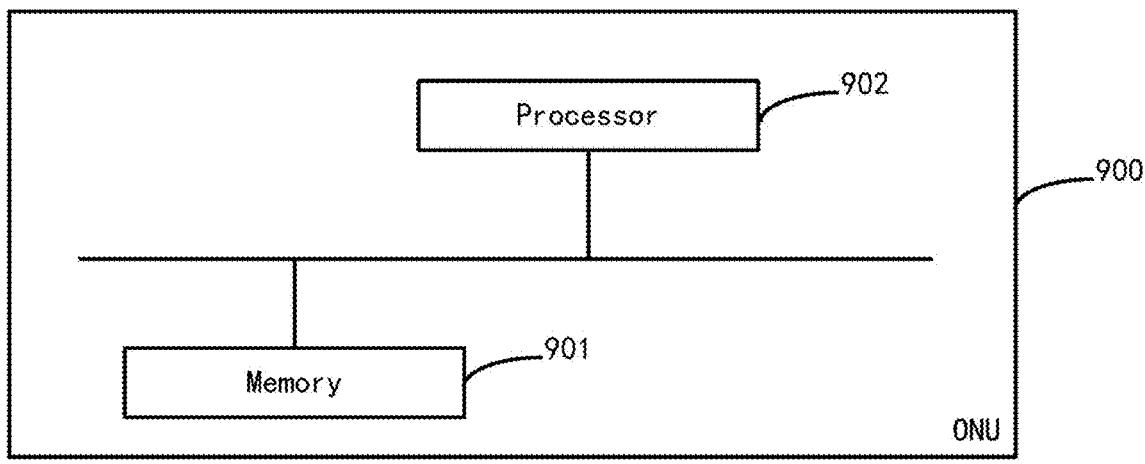
FIG. 9 is a schematic structural diagram of an ONU provided by an embodiment of the present disclosure.

FIG. 9 shows an ONU 900 provided by an embodiment of the present disclosure. The ONU 900 includes a memory 901, a processor 902, and a computer program stored in the memory 901 and executable by the processor 902 which, when executed by the processor 902, causes the processor 902 to perform the ONU migration detection method described above.

The processor 902 and the memory 901 may be connected by a bus or other means.

As a non-transient computer-readable storage medium, the memory 901 may be configured to store non-transient software programs and non-transient computer executable programs, such as the ONU migration detection method described in the embodiment of the present disclosure. The processor 902 executes non-transient software programs and instructions stored in the memory 901 to perform the ONU migration detection method described above.

The memory 901 may include a program storage area and a data storage area. The program storage area may store an operating system, and an application program required by at least one function. The data storage area may store data configured to execute the ONU migration detection method described above. In addition, the memory 901 may include a high-speed random access memory 901, and may also include a non-transient memory 901, such as at least one magnetic disk storage device, a flash memory device, or other non-transient solid state storage device. In some implementations, the memory 901 may include memories 901 remotely located with respect to the processor 902, and these remote memories 901 may be connected to the ONU 900 through networks. Examples of the above networks include, but are not limited to, the Internet, an intranet, a local area network, a mobile communication network and combinations thereof.

The non-transient software programs and instructions required to perform the above ONU migration detection method are stored in the memory 901 which, when executed by one or more processors 902, cause the one or more processors 902 to perform the above ONU migration detection method, for example, the method step S801 in FIG. 5.

An embodiment of the present disclosure further provides a computer-readable storage medium storing a computer executable instruction, where the computer executable instruction is configured to execute the above ONU migration detection method.

In an embodiment, the computer-readable storage medium stores computer executable instructions which, when executed by one or more control processors, for example, by one processor 802 in the above-mentioned OLT 800, may cause the above-mentioned one or more processors to perform the above ONU migration detection method, for example, the method steps S201 to S203 in FIG. 2 and the method steps S401 to S403 in FIG. 4, or when executed by one processor 902 in the ONU 900, may cause the one processor 902 to perform the ONU migration detection method, for example, the method step S501 in FIG. 5.

An embodiment of the present disclosure includes: receiving first identification information from an ONU, where the first identification information is configured to uniquely identify a historical position accessed by the ONU; acquiring second identification information according to a current position of the ONU, where the second identification information is configured to uniquely identify the current position; comparing the first identification information with the second identification information, and determining that ONU migration occurs when the first identification information is mismatched with the second identification information. Because the first identification information uniquely identifies the historical position of the ONU and the second identification information uniquely identifies the current position of the ONU, when ONU migration occurs, the first identification information and the second identification information are mismatched, so whether ONU migration occurs or not can be judged by whether the first identification information is matched with the second identification information or not, which is beneficial to improving the accuracy and efficiency of ONU migration detection.

The device embodiments described above are merely illustrative, and the units described as separate components may or may not be physically separated, that is, they may be located in one place, or may be distributed on multiple network elements. Some or all of the modules may be selected according to actual needs to achieve the purpose of this embodiment.

It will be understood by those having ordinary skills in the art that all or some of the steps, and systems in the method disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium. The computer-readable medium may include a computer storage medium (or a non-transitory medium) and a communication medium (or a transitory medium). As is well known to those having ordinary skills in the art, the term computer storage medium includes volatile and nonvolatile, removable and non-removable media implemented in any method or technology for storing information such as computer-readable instructions, data structures, program modules or other data. A computer storage medium may include RAMs, ROMs, EEPROMs, flash memories or other memory technologies, CD-ROMs, Digital Versatile Disk (DVDs) or other optical disk storages, magnetic cassettes, magnetic tapes, magnetic disk storages or other magnetic storage devices, or any other media that can be used to store desired information and can be accessed by a computer. In addition, it is well known to those having ordinary skills in the art that the communication medium may generally include computer-readable instructions, data structures, program modules or other data in a modulated data signal such as a carrier wave or other transmission mechanism, and may include any information delivery medium.

The above is a detailed description of some implementations of the present disclosure, but the present disclosure is not limited thereto. Those having ordinary skills in the art can also make various equivalent modifications or substitutions without departing from the sharing conditions of the scope of the present disclosure, and these equivalent modifications or substitutions are all included in the scope defined by the claims of the present disclosure.

What is claimed is:

1. An Optical Network Unit (ONU) migration detection method, performed by an Optical Line Termination (OLT), comprising:
   receiving, by the OLT, first identification information from an ONU, wherein the first identification information is configured to uniquely identify the OLT of a historical position accessed by the ONU;
   acquiring, by the OLT, second identification information according to a current position accessed by the ONU, wherein the second identification information is configured to uniquely identify the OLT of the current position accessed by the ONU; and
   comparing, by the OLT, the first identification information with the second identification information, and outputting, by the OLT, a comparison result determining that ONU migration occurs in response to the first identification information being mismatched with the second identification information.

2. The ONU migration detection method of claim 1, wherein:
   the first identification information comprises a first Optical Line Termination (OLT) identifier (ID), and the second identification information comprises a second OLT ID.

3. The ONU migration detection method of claim 2, wherein:
   the first OLT ID comprises a first PON board ID, and the second OLT ID comprises a second PON board ID; or
   the first OLT ID comprises a first manufacturer ID and a first PON board ID, and the second OLT ID comprises a second manufacturer ID and a second PON board ID.

4. The ONU migration detection method of claim 2, wherein:

the first identification information further comprises a first port ID, and the second identification information further comprises a second port ID.

5. The ONU migration detection method of claim 4, wherein:
the first identification information further comprises a first channel ID, and the second identification information further comprises a second channel ID.

6. The ONU migration detection method of claim 1, wherein in response to determining that ONU migration occurs, the method further comprises one of:
sending an update instruction to the ONU to enable the ONU to update service configuration data; or
sending a restart instruction to the ONU to restart the ONU.

7. The ONU migration detection method of claim 1, further comprising:
in response to the first identification information being consistent with the second identification information, acquiring a first count value of a first MIB (Management Information Base) counter of the ONU;
acquiring a second count value of a local second MIB counter; and
comparing the first count value with the second count value, and in response to the first count value being mismatched with the second count value, updating the first count value to the second count value and/or updating the service configuration data of the ONU.

8. The ONU migration detection method of claim 1, wherein the method further comprises:
sending the second identification information to the ONU.

9. The ONU migration detection method of claim 2, wherein the method further comprises:
sending the second identification information to the ONU.

10. The ONU migration detection method of claim 3, wherein the method further comprises:
sending the second identification information to the ONU.

11. The ONU migration detection method of claim 4, wherein the method further comprises:
sending the second identification information to the ONU.

12. The ONU migration detection method of claim 5, wherein the method further comprises:
sending the second identification information to the ONU.

13. The ONU migration detection method of claim 6, wherein the method further comprises:
sending the second identification information to the ONU.

14. The ONU migration detection method of claim 7, wherein the method further comprises:
sending the second identification information to the ONU.

15. A non-transitory computer-readable storage medium, storing a computer executable instruction which, when executed by a computer, causes the computer to perform an Optical Network Unit (ONU) migration detection method applied to an Optical Line Termination (OLT), the ONU migration detection method comprising:
receiving, by the OLT, first identification information from an ONU, wherein the first identification information is configured to uniquely identify the OLT of a historical position accessed by the ONU;
acquiring, by the OLT, second identification information according to a current position accessed by the ONU, wherein the second identification information is configured to uniquely identify the OLT of the current position accessed by the ONU; and
comparing, by the OLT, the first identification information with the second identification information, and outputting, by the OLT, a comparison result determining that ONU migration occurs in response to the first identification information being mismatched with the second identification information.

* * * * *